United States Patent
Amarant et al.

(10) Patent No.: US 11,745,225 B1
(45) Date of Patent: Sep. 5, 2023

(54) SYSTEM FOR IDENTIFYING A GOLF BALL HAVING A RADAR DETECTABLE MARK

(71) Applicant: Acushnet Company, Fairhaven, MA (US)

(72) Inventors: Leonidas Amarant, Middletown, RI (US); Martin Gray, Taunton, MA (US); Ken Rebello, Acushnet, MA (US); Kevin Carando, Mattapoisett, MA (US); David Coelho, Mattapoisett, MA (US); Vincent J. Simonds, Brimfield, MA (US)

(73) Assignee: Acushnet Company, Fairhaven, MA (US)

( * ) Notice: Subject to any disclaimer, the term of this patent is extended or adjusted under 35 U.S.C. 154(b) by 35 days.

(21) Appl. No.: 17/496,823

(22) Filed: Oct. 8, 2021

(51) Int. Cl.
| | | |
|---|---|---|
| *B07C 5/344* | (2006.01) | |
| *A63B 47/00* | (2006.01) | |
| *C09D 11/52* | (2014.01) | |
| *G01S 13/88* | (2006.01) | |

(52) U.S. Cl.
CPC .......... *B07C 5/344* (2013.01); *A63B 47/008* (2013.01); *C09D 11/52* (2013.01); *G01S 13/88* (2013.01)

(58) Field of Classification Search
CPC .... B07C 3/10; B07C 3/12; B07C 3/14; B07C 3/16; B07C 5/3412; B07C 5/344; A63B 47/008; A63B 47/00; C09D 11/52; G01S 13/88
USPC .......................................................... 209/571
See application file for complete search history.

(56) References Cited

U.S. PATENT DOCUMENTS

| | | | | |
|---|---|---|---|---|
| 4,555,028 | A * | 11/1985 | Valehrach | G01N 3/40 73/78 |
| 6,839,138 | B2 * | 1/2005 | Welchman | G01N 21/951 356/394 |
| 8,008,641 | B2 * | 8/2011 | Harris | G01J 3/46 250/559.43 |
| 9,821,345 | B2 * | 11/2017 | Sterkel | G01N 3/40 |
| 10,799,770 | B1 * | 10/2020 | Semsak | G06K 7/10425 |
| 11,058,924 | B1 * | 7/2021 | Caterina | A63B 47/008 |
| 2018/0326263 | A1 * | 11/2018 | Rausch | A63B 47/002 |
| 2022/0176414 | A1 * | 6/2022 | Jenkins | B07C 5/34 |

FOREIGN PATENT DOCUMENTS

| | | | |
|---|---|---|---|
| JP | H0755678 A | * | 3/1995 |
| JP | H07100228 A | * | 4/1995 |
| JP | H07112045 A | * | 5/1995 |
| KR | 20160031356 A | * | 3/2016 |
| KR | 102258670 B1 | * | 5/2021 |

* cited by examiner

*Primary Examiner* — Gene O Crawford
*Assistant Examiner* — Muhammad Awais
(74) *Attorney, Agent, or Firm* — Steven Landolfi, Jr.

(57) ABSTRACT

A golf ball sorting system has a ball feeder, a ball mover, a detector, and a sorting system. The ball feeder may be configured to receive a plurality of golf balls. The ball mover may be configured to move each of the plurality of golf balls one at a time at a predetermined minimum speed. The detector may be configured to inspect each of the plurality of golf balls moved by the movement mechanism and output a detection result based on the inspection. The sorting system may be configured to receive the detection result and sort the plurality of golf balls based on the detection result to separate golf balls that include a mark that is not visible to an observer from golf balls that do not include a mark.

17 Claims, 7 Drawing Sheets

SYSTEM FOR IDENTIFYING A GOLF BALL HAVING A RADAR DETECTABLE MARK

FIELD OF THE INVENTION

The present disclosure relates generally to system for identifying golf balls having a mark, or a plurality of marks, and, more particularly, relates to a sorting system for distinguishing golf balls having radar detectable marks from golf balls that do not have radar detectable marks.

BACKGROUND OF THE INVENTION

Interest continues to increase in golf experiences which require a system for detecting golf ball launch conditions, such as golf simulators and golf equipment fitting. Such systems typically use radar tracking systems to identify the position and velocity of the golf ball to calculate the launch parameters and trajectory of the ball. These radar tracking systems have been improved by including specific radar detectable marks on the golf balls and using the marked golf balls in conjunction with the system instead of an unmarked golf ball.

Golf balls that include these radar detectable marks are useful in providing launch condition data, but may be indistinguishable from golf balls not having such marks, depending on how the marks are applied. For instance, a radar detectable mark may be applied to a layer that is not the outer-most layer of the golf ball, and thus is covered by another layer and/or paint, rendering the mark invisible to an observer. This characteristic can be beneficial to allow the golfer to use marked golf balls interchangeably with unmarked golf balls, but may cause problems in certain instances. For example, this condition could lead to situations in which it is unknown whether a supply of golf balls are marked, unmarked, or include both types. Other issues may arise around quality control, for example, as a visual inspection of the mark on the golf ball would not be possible. Disclosed embodiments address these and other problems associated with golf balls having radar detectable marks.

SUMMARY OF THE INVENTION

In some embodiments, the present disclosure describes a golf ball sorting system including a ball feeder, a ball mover, a detector, and a sorting system. The ball feeder may be configured to receive a plurality of golf balls. The ball mover may be configured to move each of the plurality of golf balls one at a time at least at a predetermined minimum speed. The detector may be configured to inspect each of the plurality of golf balls moved by the movement mechanism and output a detection result based on the inspection. The sorting system may be configured to receive the detection result and sort the plurality of golf balls based on the detection result to separate golf balls that include a mark that is not visible to an observer from golf balls that do not include a mark.

In some embodiments, the present disclosure describes a golf ball sorting system including an input tube, a track, a detector, and a sorting system. The input tube may be configured to provide a single file line of golf balls to a release block. The track is connected at a downward pitch to the release block and configured to receive a golf ball and cause the golf ball to travel down the track. The detector may be configured to inspect each golf ball that travels down the track and determine a detection result based on whether a target mark is identified on the inspected golf ball. In at least some embodiments, the target mark is not visible to an observer. The sorting system may be configured to sort golf balls based on the detection result.

In some other embodiments, the present disclosure describes a golf ball sorting method. The method includes receiving a plurality of golf balls, at least one of which comprises a radar detectable mark that is not visible to an observer, sequentially imparting at least a predetermined minimum speed to each of the plurality of golf balls, inspecting each of the plurality of golf balls with a radar detector to determine a detection result based on whether the inspected golf ball includes the radar detectable mark or not, and sorting the plurality of golf balls based on the detection results, including separating golf balls that have the radar detectable mark from golf balls that do not have the radar detectable mark.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION OF THE INVENTION

In order to improve the ability of some golf ball monitoring systems, such as launch monitors and golf simulators, to identify a golf ball in-flight and detect its motion parameters, certain marks have been added to one or more surfaces of the golf ball. For example, a golf ball may include one or more layers which have at least one radar detectable mark disposed on a surface thereof. The radar detectable mark or combination of marks is identifiable by a radar detection device to enhance detection reliability and help to orient the ball and measure its translational and rotational velocity as it moves through the air at launch.

Disclosed embodiments include systems and methods for sorting golf balls having one or more marks, and, in particular, golf balls that have radar detectable marks that are not visible to an observer. The system may include at least a detector and a sorting system. The detection mechanism may be configured to make a determination as to whether a golf ball includes a mark based on information obtained from the golf ball. The sorting system may be configured to receive the determination from the detection mechanism and perform an action to indicate the result of the determination.

For example, the sorting system may direct the ball to a particular collection bin depending on whether the detection mechanism detects a mark on the golf ball.

Disclosed embodiments may be implemented in a variety of systems, including stand-alone sorting systems and in-line manufacturing systems. In one example, a source of golf balls is fed to a detection mechanism and the golf balls are sorted based on output of the detection mechanism. In another example, a disclosed system may be incorporated into a manufacturing or packaging line to sort and/or perform quality control to identify golf balls that have a mark and/or separate out golf balls that do not have a mark.

Further, disclosed embodiments are not limited to detection of any particular type or shape of mark and can be adapted to work in different systems and environments depending on the mark being target. In addition, disclosed embodiments are not limited to radar detection and radar detectable marks. Disclosed embodiments may include systems that use other types of detection other than radar, such as optical sensing, x-ray sensing, magnetic sensing, etc. It follows that golf balls with marks that are not radar detectable may nonetheless be used in conjunction with some disclosed detection systems. Moreover, it is not necessary that the mark be non-visible to an observer, as there is a benefit of high-speed sorting of a large quantity of golf balls regardless of whether the mark can be seen.

Figure 1:
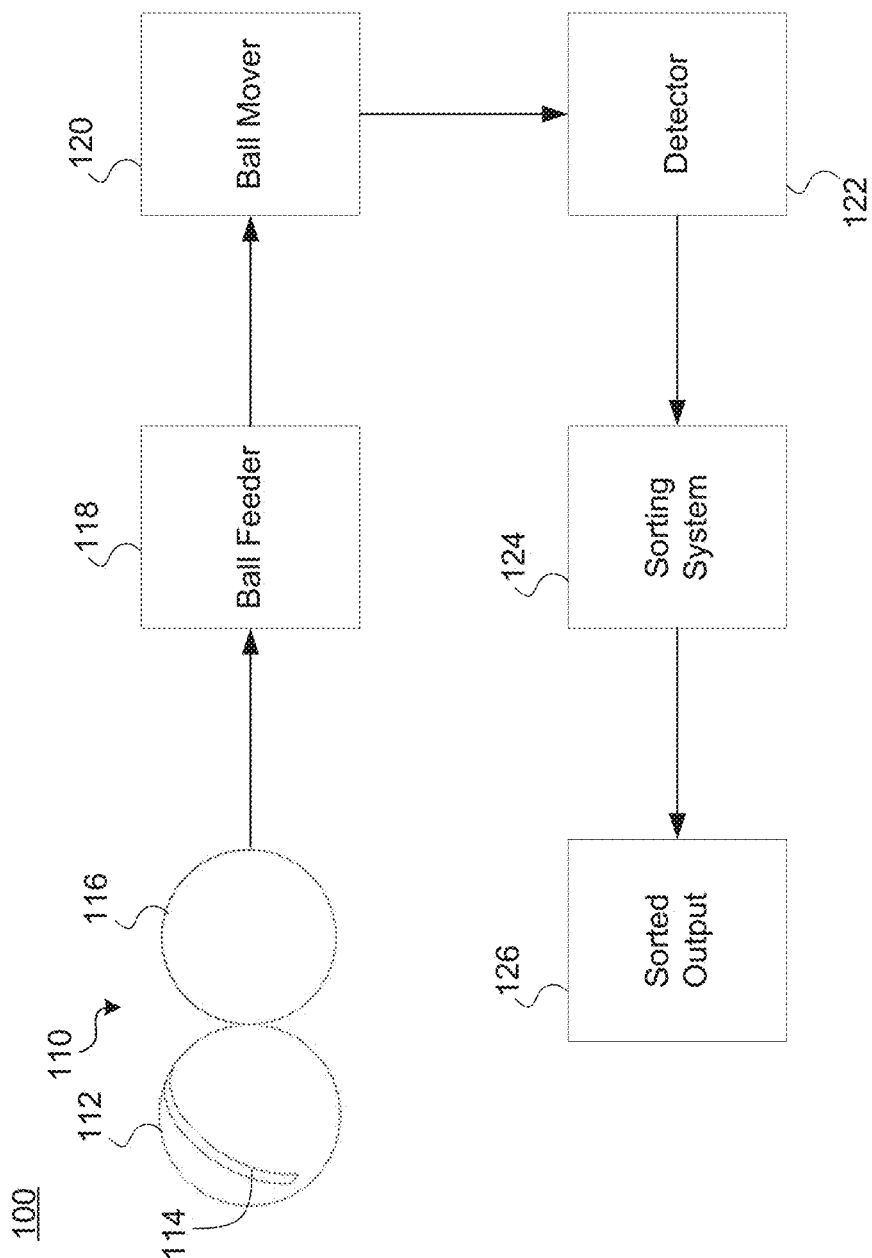
FIG. 1 is a diagram of an exemplary embodiment of a golf ball sorting system, consistent with disclosed embodiments.

FIG. 1 is a diagram of an exemplary golf ball sorting system 100. The golf ball sorting system 100 may be configured to receive a source of golf balls 110, where the source of golf balls 110 may include at least one of a golf ball 112 having a radar detectable mark 114 or a golf ball 116 not having a radar detectable mark. The system 100 may be configured to distinguish between golf ball 112 and golf ball 116. The particular radar detectable mark 114 is not limited and may include a single mark or a plurality of marks. Although the radar detectable mark 114 is shown in the figure for illustrative purposes, it should be understood that in at least some embodiments the radar detectable mark 114 is applied to an underlying surface of the golf ball 112 and is not visible to an observer (e.g., because it is covered by another layer, paint, etc.). In some embodiments, the mark may be visible, such as when it is applied to an outermost layer or an outer layer is transparent. In some embodiments, the radar detectable mark 114 is a metallic substance. For example, the radar detectable mark 114 may be an electrically conductive ink applied to a layer of the golf ball 112. Non-limiting examples of golf balls having radar detectable marks are described in U.S. Provisional Patent Application Nos. 63/116,535, titled "Golf Ball Having a Radar Detectable Mark" and 63/212,225, titled "Golf Ball Having At Least One Radar Detectable Mark."

The golf ball sorting system 100, in at least one embodiment, includes a ball feeder 118, a movement mechanism 120, a detector 122, and a sorting system 124. The source of golf balls 110 is received at the ball feeder 118 and is output by the sorting system 124 to produce sorted output 126. The ball feeder 118 may be configured to receive and singulate a plurality of golf balls such that they may be individually fed to the movement mechanism 120.

The movement mechanism 120 may be configured to induce movement of a golf ball received from the ball feeder 118 and place the golf ball under conditions that are acceptable for analysis by the detector 122. For example, the movement mechanism 120 may include a track having a length and pitch specified to induce a threshold translational and rotational velocity to the golf ball. In other embodiments, the movement mechanism 120 may be motorized or otherwise powered device configured to impart motion to the golf ball. In still other embodiments, the movement mechanism 120 may be a cart or tubing configured to move the golf ball through the golf ball sorting system 100. The movement mechanism 120 may be part of a manufacturing and/or packaging line that provides golf balls to the detector 122 and further transfers the inspected golf balls to a further manufacturing or packaging station after sorting.

The detector 122 may be a detection mechanism configured to interface with a golf ball, such as a golf ball placed into motion by the movement mechanism 120. The detector 122 may be configured to detect at least one parameter of the golf ball, wherein the parameter indicates the presence or absence of a target mark. For example, the detector 122 may be a ball launch monitor configured to detect a mark on the golf ball using radar. The ball launch monitor may be a device configured to switch between a monitoring mode in which the device is set to detect launch conditions of a golf ball hit with a golf club and a detection mode in which the device is configured to detect the mark on the golf ball and output a result. In other embodiments, the detector 122 may be configured to use other means of detection, such as metal detection, optical scanning, x-ray, infrared, mass detectors (weight), etc. For example, the detector 122 may be a ring sensor to detect trace levels of nonferrous metal used to apply a mark. For example, the detector 122 may use an Altech™ 100 mm high sensitivity ring sensor. The detector 122 in this embodiment may be configured to detect metal with a low presence level while product is moving through the sensor.

The sorting system 124 may be a mechanical device configured to perform an action based on the result of a detection result. For example, the sorting system 124 may be configured to direct a golf ball to a particular location (e.g., a collection bin) based on a detection result (i.e., a determination that a golf ball does or does not have a radar detectable mark). In another example, the sorting system 124 may be configured to perform an action to identify a golf ball as marked or unmarked, such as by applying a stamp, sticker or tag to the golf ball to identify the result of the detection result. As a result of the sorting system 124 performing an action on golf balls that have been inspected by the detector 122, the golf ball sorting system 100 produces the sorted output 126. For example, the sorted output 126 may include the golf ball 112 with the radar detectable mark 114 placed into a first bin or pile and the golf ball 116 without the radar detectable mark placed into a second bin or pile.

Figure 2:
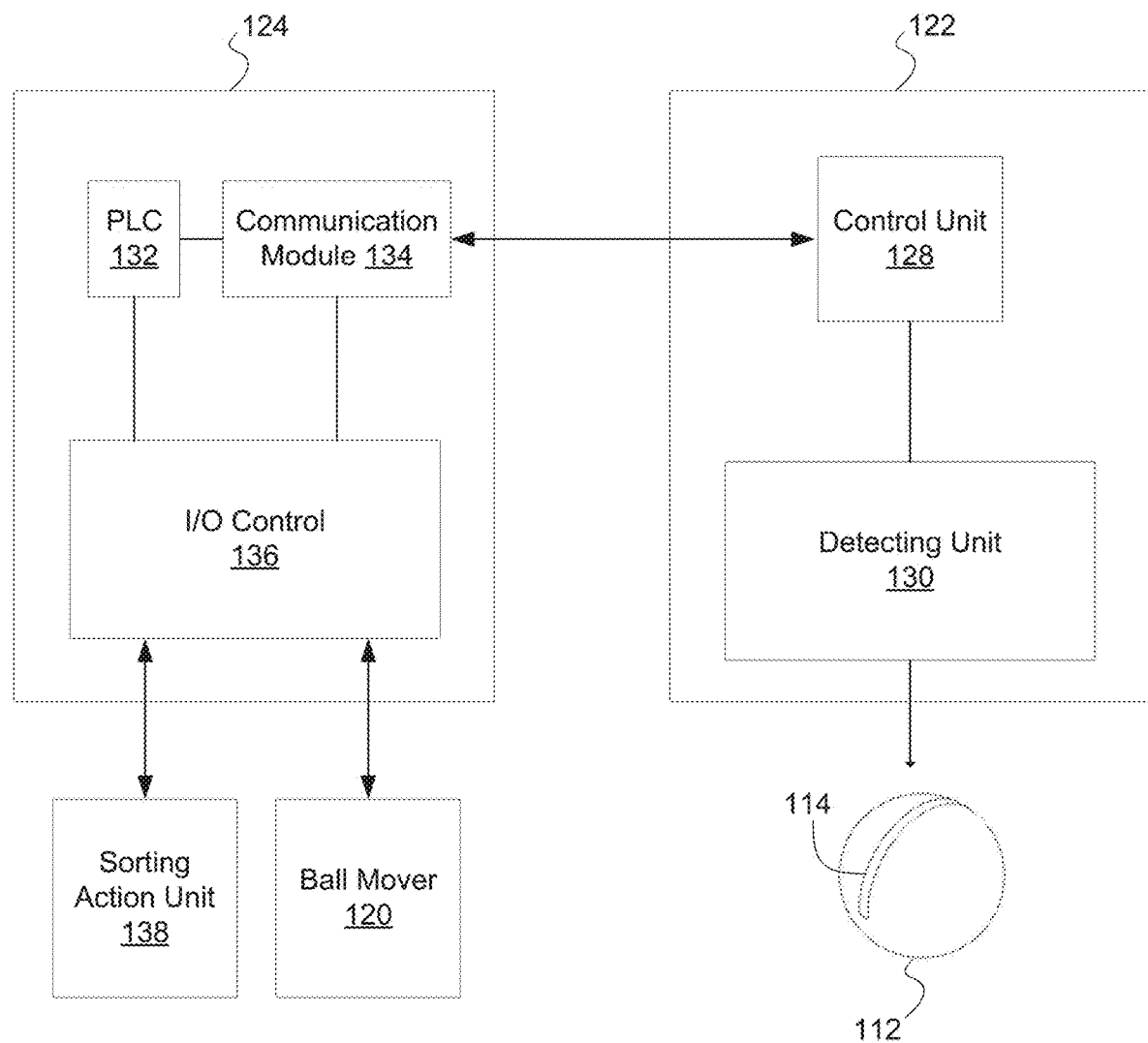
FIG. 2 is a diagram of an exemplary embodiment of a detector and a sorting system of the golf ball sorting system.

FIG. 2 is a block diagram further illustrating an exemplary embodiment of the detector 122 and the sorting system 124. In an exemplary embodiment, the detector 122 includes at least a control unit 128 and a detecting unit 130. The control unit 128 may be a computing device such as a microcontroller configured to perform one or more software tasks. The control unit 128 may be configured to send and receive data to and from the detecting unit 130. For example, the control unit 128 may send a signal to turn on the detecting unit 130 and instruct the detecting unit 130 to obtain detection data. The detecting unit 130 may be a sensor, such as a doppler radar sensor, laser detector, metal detector, optical sensor, x-ray, etc. The detecting unit 130 may receive an instruction from the control unit 128 and return detection data (e.g., signals indicative of a target parameter) to the control unit 128. The control unit 128 may be configured to analyze the returned detection data and determine a detection result, such as the presence or absence of a target mark on a golf ball. For example, the detecting unit 130 may be a doppler radar sensor that directs attention to a radar detectable mark 114 present on the golf ball 112. The control unit 128 may determine that the radar detectable mark 114 is present based on the data received from the detecting unit 130 and produce an appropriate output signal. For example, the control unit 128 may measure a signal strength in the data received from the detecting unit 130 and determine whether the signal exceeds a threshold that reliably indicates the presence of a target mark.

The control unit 128 is configured to electronically interface with the sorting system 124. The sorting system 124 may include a programmable logic controller (PLC) 132, a communication module 134, and one or more input/output (I/O) controls 136. The PLC 132 is configured to send and receive data to the control unit 128 of the detector 122 via the communication module 134. In one embodiment, the communication module 134 is an application programming interface (API) which enables the PLC 132 to interpret the data received from the control unit 128. For example, the control unit 128 may output a detection result, such as Yes/No/Undetermined based on a determination of whether a golf ball that is scanned by the detector 122 includes a mark. The PLC 132 may receive the detection result from the control unit 128 via the communication module 134.

The PLC 132 may be further configured to provide control instructions to components of the golf ball sorting system 100 via the I/O control 136. For example, the PLC 132 may provide an instruction to a sorting action unit 138 to perform a sorting action based on a detection result received from the control unit 128. In one example, the sorting action unit 138 may be a control valve configured to control the path of a golf ball. For example, the sorting action unit 138 may direct a golf ball to a particular collection bin based on whether the golf ball was determined to be marked, unmarked, or undetermined. In another example, the sorting action unit 138 may apply an identification tag to a golf ball based on the detection result. In this way, a detection result can be converted into a mechanical action of sorting golf balls based on the presence or absence of a radar detectable mark, thereby informing a user seeking to identify one or more golf balls fed into the golf ball sorting system 100. In some embodiments, the PLC 132 may further control other aspects of the golf ball sorting system 100, such as the movement mechanism 120. For example, the PLC 132 may determine that a golf ball has cleared through a detection area and instruct the movement mechanism 120 to release the next golf ball for movement to the detection area (e.g., via a valve-controlled escapement block). Other examples of PLC 132 controls may include uplift/feeding by the ball feeder 118, release/transfer of a golf ball between different stages of the system, mode control and power switching of the control unit 128, control of feedback throughout the system (e.g., monitoring of safety sensors), and control of a user interface (e.g., a separate computing device, touchscreen, mobile device, etc.) The PLC 132 may be controllable to adjust the golf ball throughput of the golf ball sorting system 100 by adjusting one or more of the connected devices and systems.

Figure 3:
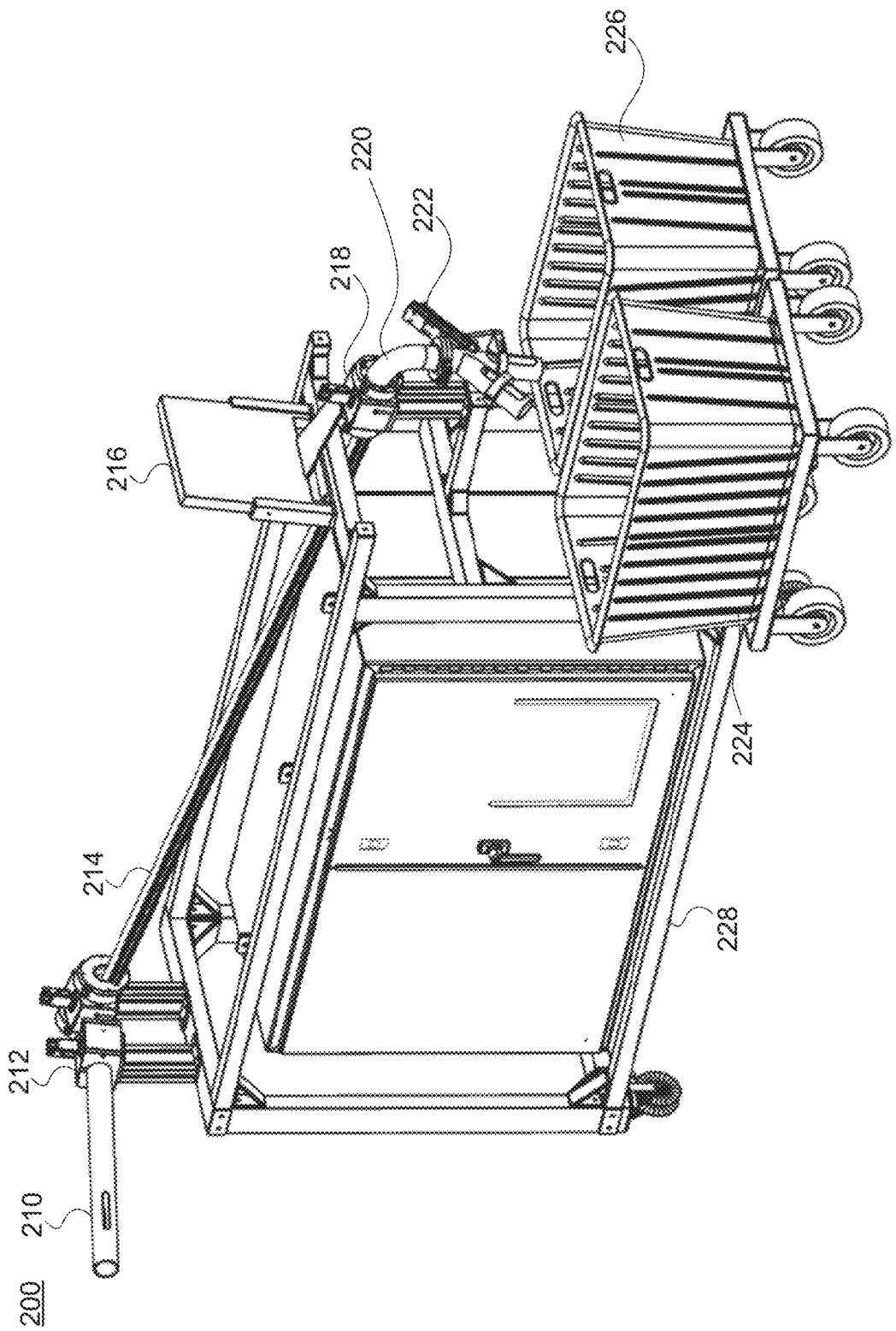
FIG. 3 is a perspective view of an embodiment of a golf ball sorting system, consistent with disclosed embodiments.
Figure 4:
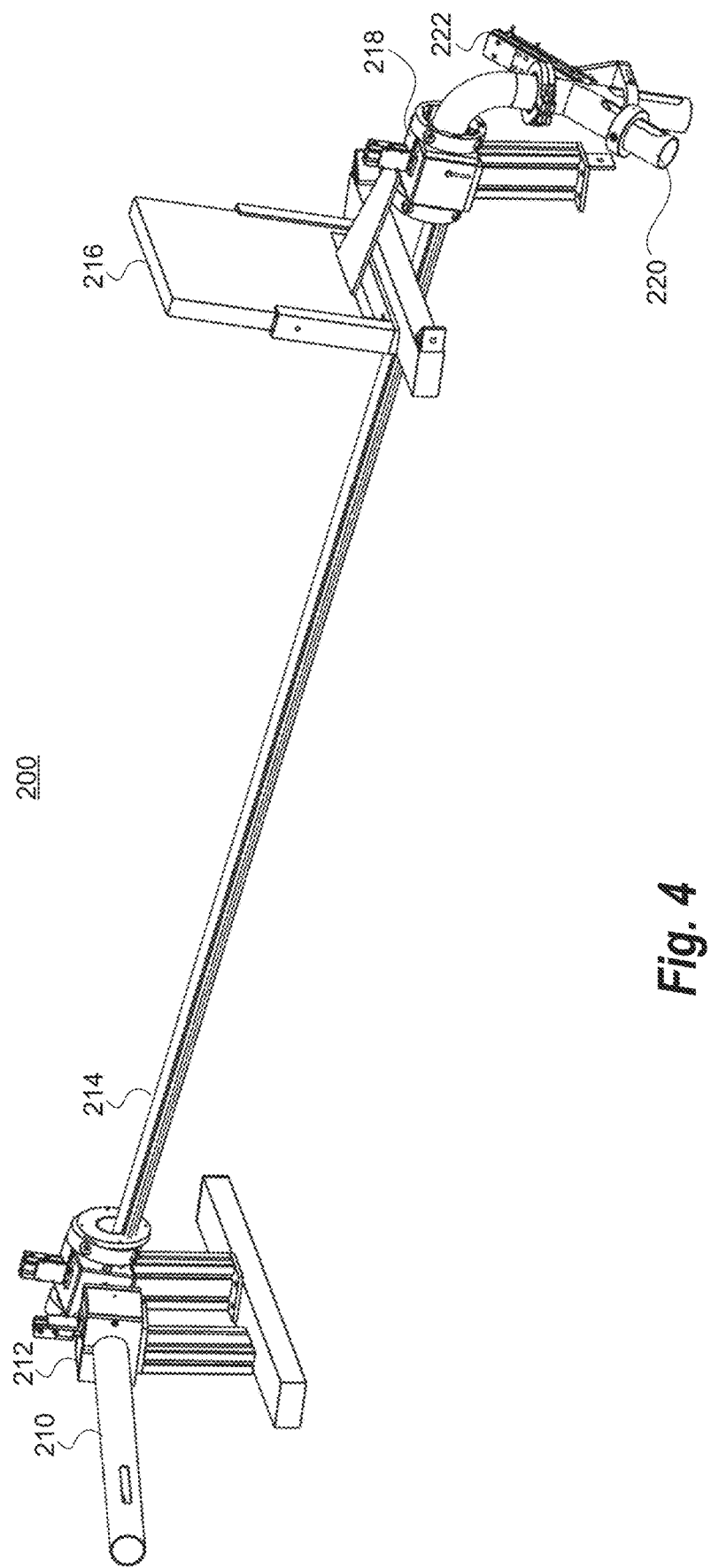
FIG. 4 is a perspective view of a moving, detecting, and sorting portion of the system of FIG. 3.

FIGS. 3 and 4 illustrate an exemplary embodiment of a golf ball sorting system 200. The golf ball sorting system 200 is an exemplary implementation of the golf ball sorting system 100. The golf ball sorting system 200 may include a ball feeder in the form of an input tube 210, a movement mechanism including a release block 212 and a sloped track 214, a detector 216 having a doppler radar sensor directed at an end portion of the track 214, and a sorting system including a output block 218, multi-path tubing 220, a path control device 222, and multiple collection bins 224 and 226. The golf ball sorting system 200 may be supported by a frame 228 to hold the relative positions of the components. In other embodiments, the golf ball sorting system 200 may be integrated into a manufacturing line, such as to perform quality control functions during a manufacturing process.

The input tube 210 may receive a plurality of golf balls for which it the presence, absence, or quality of a radar detectable mark is sought to be determined. The input tube 210 may be the general size and shape to receive a single-file line of golf balls and feed each golf ball to the release block 212. The release block 212 may be passively or actively controlled (e.g., via a valve) to release the golf ball onto the track 214. The track 214 may be, for example, a polycarbonate tube sized to support a rolling golf ball. The track 214 may include a length and pitch predetermined to impart at least a minimum speed (e.g., translational and rotational velocity) to the golf ball via gravity according to reliability specifications of the detector 216. In an exemplary embodiment, the pitch of the track 214 may be between 4-30 degrees relative to a horizontal plane with a track length of at least 24 inches. In one embodiment, the track 214 may include a pitch of 8 degrees relative to the horizontal and a length of at least 4 feet, as these parameters have been found to impart a sufficient translational and rotational velocity to the ball for reliable detection.

The detector 216 may be a radar device including a control unit configured to receive radar detection data of a golf ball passing through a detection area and output a detection result based on the received data. For example, the detector 216 may output a Yes/No/Undetermined detection result regarding whether the golf ball includes a target mark. The target mark may be any radar detectable mark or a radar detectable mark of sufficient quality to be detected. In some embodiments, the target mark is a marking added to the golf ball to enhance radar detection during launch monitoring (e.g., by the detector 216 or a similar device in a launch setting). In other embodiments, the target mark could be a quality or authenticity mark to distinguish the golf ball from other golf balls (e.g., counterfeit golf balls not bearing the mark).

The detector 216 is configured to output the detection result to a PLC of the golf ball sorting system 200. The PLC may receive the detection result and provide control instructions to a path control device 222 to control the path of the golf ball through the multi-path tubing depending on the detection result. For example, the path control device 222 may divert the golf ball to a selected path based on the detection result. The PLC may also perform throughput control through control of the release block 212 and the output block 218 to ensure proper timing and spacing between golf balls. In some embodiments, the PLC may control the golf ball sorting system 200 to sort approximately 20 balls per minute, and in some embodiments, up to 60 balls per minute.

Figure 5:
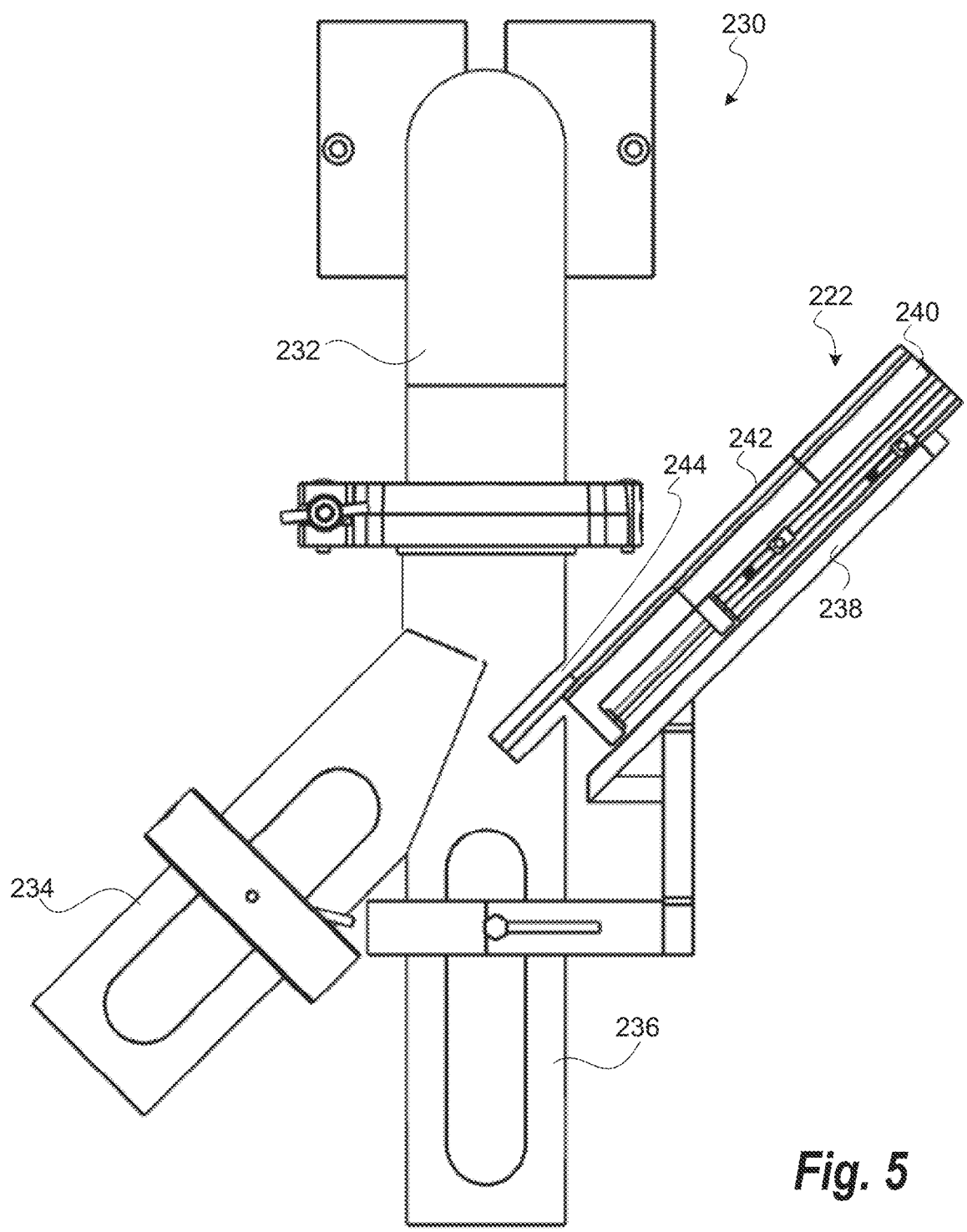
FIG. 5 is a front view of an exemplary sorting system of the system of FIG. 3, consistent with disclosed embodiments.
Figure 6:
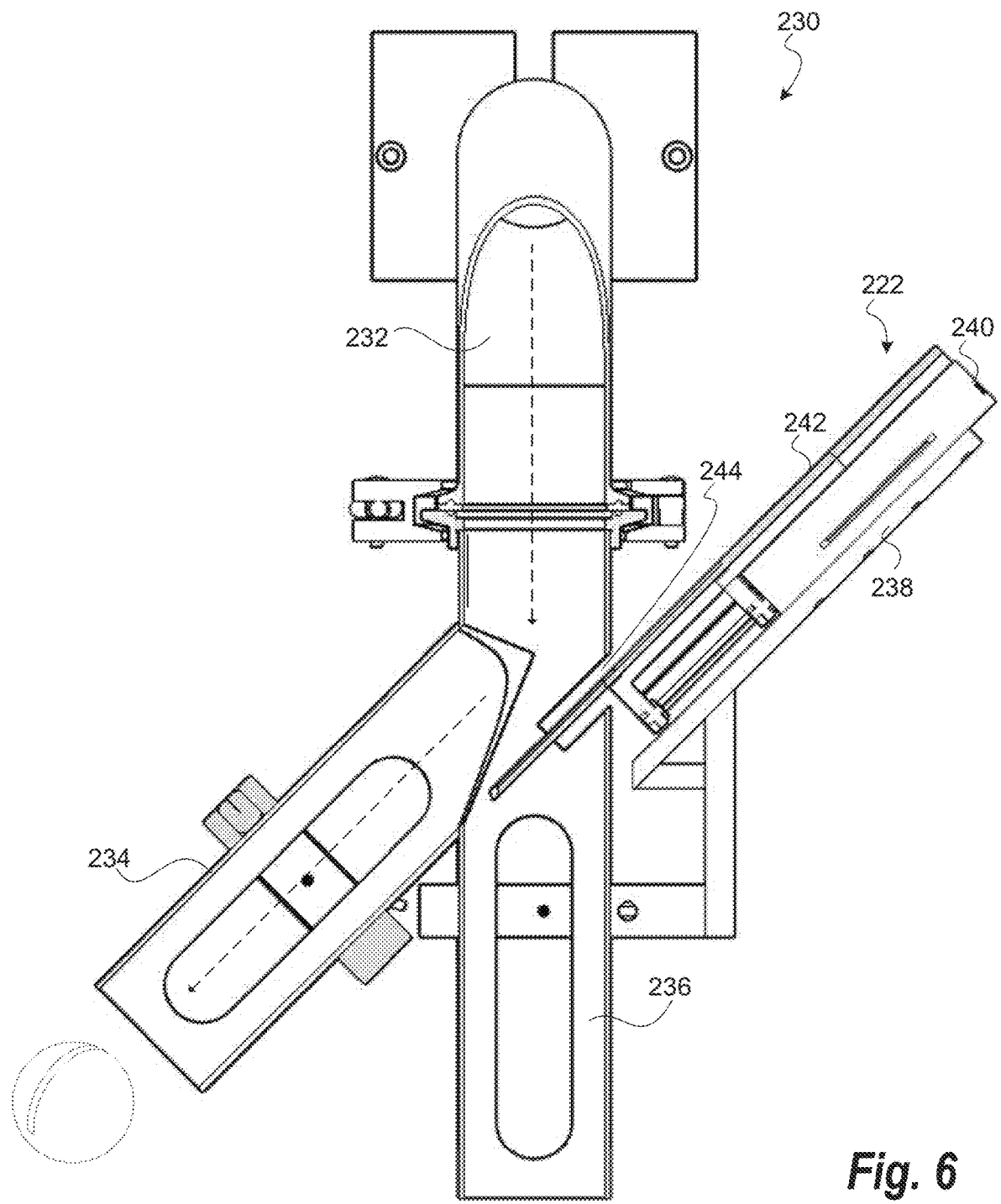
FIG. 6 is a cross-sectional view of the sorting system of FIG. 5 with a guide plate in a first position.
Figure 7:
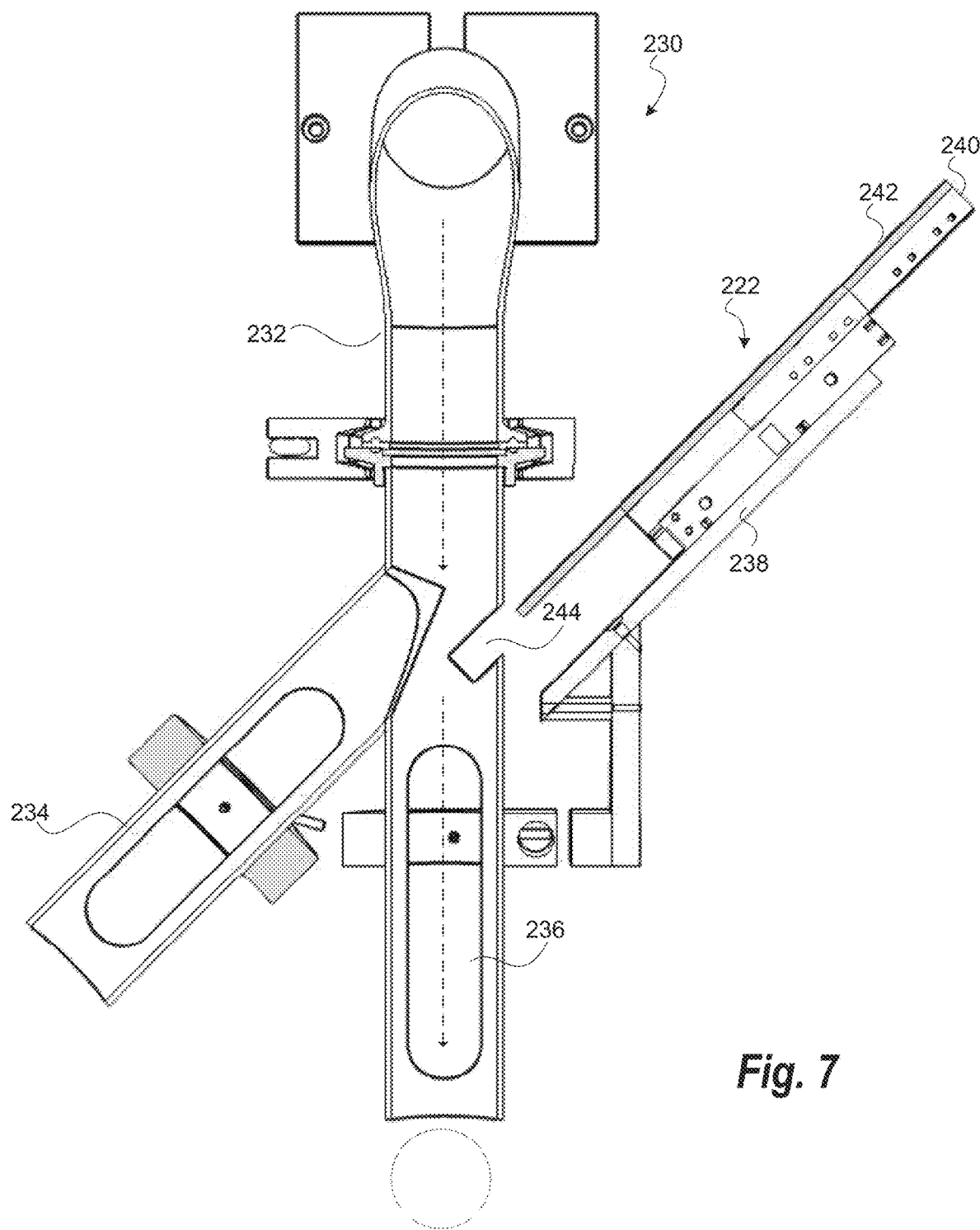
FIG. 7 is a cross-sectional view of the sorting system of FIG. 5 with a guide plate in a second position.

FIGS. 5-7 further illustrate an exemplary sorting system 230 that may be included with the golf ball sorting system 200 for sorting golf balls based on a detection result. The sorting system 230 includes the multi-path tubing 220 comprising a lead tube 232, a first branch tube 234, and a second branch tube 236. The sorting system 230 also includes the path control device 222 including a stationary block 238, a slide block 240, a guide plate 242, and a slot 244 formed in the tubing 220 at an intersection of the lead tube 232, first branch tube 234, and second branch tube 236. A PLC may be configured to control the slide block 240 (e.g., via a control valve) to move between a first position (FIGS. 5 and 6) and a second position (FIG. 7). The guide plate 242 may be attached to the slide block 240 to move therewith (i.e., the guide plate 242 is also movable between a first position and a second position). In the first position, the guide plate 242 may be positioned in the slot 244 to direct a golf ball from the lead tube 232 to the first branch tube 234 (and out into the first collection bin 224). In the second position, the guide plate 242 may be removed from slot 244 to thereby allow the golf ball to pass from the lead tube 232 to the second branch tube 236 (and out into the second collection bin 226). In this way, the PLC may sort golf balls based on a detection result from the detector 216.

The disclosed embodiments have been described but may have variations within the scope of the disclosure. In some embodiments, a detection system may be implemented to distinguish one type of mark from another. In other words, two balls may be sorted even though both balls include a radar detectable mark. In another example, the detection system may be used to sort out counterfeit golf balls by removing golf balls that do not include an authentication mark. In some embodiments, the detection system may be placed in-line in a manufacturing or packaging line and the sorting may occur to remove balls (e.g., via a kickout) that do not pass an inspection (e.g., do not include a radar detectable mark, a mark of sufficient quality, or the system cannot determine the presence of a mark) and pass golf balls that satisfy the inspection along to the next station. Similarly, the present disclosure may be applicable to inspection of in-process golf balls (i.e., golf balls for which manufacturing is not yet complete or partial golf balls such as a core or cover).

The disclosed golf ball sorting system may be particularly applicable to detection of radar detectable marks that are applied to a golf ball to enhance launch monitoring but which are not visible by an observer. In an exemplary inspection process, a plurality of golf balls are fed into a detection system and the output is sorted depending on detection results. The golf balls may be imparted with a threshold speed in order to ensure sufficient reliability of the detection process by a detector. Golf balls having a radar detectable mark may be placed in one area while golf balls not having the mark or for which it was undetermined may be placed in another area. As a result, golf balls that look the same to an observer can be sorted based on underlying characteristics, thereby enhancing the ability of the manufacturer to reliably identify and deliver different types of golf balls.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all modifications and embodiments which would come within the spirit and scope of the present invention.

The invention claimed is:

1. A golf ball sorting system, comprising:
a ball feeder configured to receive a plurality of golf balls;
a movement mechanism configured to move each of the plurality of golf balls one at a time at least at a predetermined minimum speed;
a detector comprising a control unit and a detecting unit, wherein the control unit is configured to receive detection data from the detecting unit, and wherein the detector is configured to:
inspect each of the plurality of golf balls moved by the movement mechanism,
detect whether each of the plurality of golf balls comprise an electrically-conductive mark applied to a layer thereof, wherein the electrically-conductive mark is not visible to an observer because the electrically-conductive mark is covered by at least one other layer of the golf ball, and
output a detection result based on the inspection; and
a sorting system configured to receive the detection result and sort the plurality of golf balls based on the detection result to separate golf balls that include the electrically-conductive mark from golf balls that do not include the electrically-conductive mark.

2. The golf ball sorting system of claim 1, wherein the control unit is configured to determine the detection result based on the detection data from the detecting unit.

3. The golf ball sorting system of claim 1, wherein the detecting unit is a doppler radar sensor.

4. The golf ball sorting system of claim 1, wherein the detecting unit is selected from the group consisting of a laser detector, metal detector, optical sensor, x-ray sensor, or an infrared sensor.

5. The golf ball sorting system of claim 1, wherein the sorting system comprises a programmable logic controller (PLC) configured to receive the detection result from the control unit.

6. The golf ball sorting system of claim 5, wherein the PLC is connected to the control unit by an application programming interface (API).

7. The golf ball sorting system of claim 5, wherein the PLC is connected to a sorting action unit configured to perform an action dependent on the detection result.

8. The golf ball sorting system of claim 5, wherein the PLC is connected to the movement mechanism to control the timing of the movement of each of the plurality of golf balls.

9. The golf ball sorting system of claim 1, wherein the electrically-conductive mark is applied to the golf ball as electrically conductive ink.

10. A golf ball sorting system, comprising:
an input tube configured to provide a single file line of golf balls to a release block;
a track connected at a downward pitch to the release block and configured to receive a golf ball and cause the golf ball to travel down the track;
a radar detector configured to inspect each golf ball that travels down the track and determine a detection result based on whether a target mark comprising an electrically-conductive ink is identified on the inspected golf ball, wherein the target mark is not visible to an observer because the target mark is covered by at least one other layer of the golf ball; and
a sorting system configured to sort golf balls based on the detection result.

11. The golf ball sorting system of claim 10, further comprising a programmable logic controller (PLC) configured to control the sorting system based on the detection result.

12. The golf ball sorting system of claim 11, wherein the PLC is configured to control a path control device to divert the golf ball to a selected path based on the detection result.

13. The golf ball sorting system of claim 12, wherein sorting system comprises multi-path tubing comprising a lead tube, a first branch tube, and a second branch tube.

14. The golf ball sorting system of claim 13, wherein the path control device comprises a slide block and a guide plate moveable between a first position and second position, and wherein the guide plate controls a golf ball path from the lead tube:

to the first branch tube in the first position, and
to the second branch tube in the second position.

15. The golf ball sorting system of claim 11, wherein the PLC is configured to control release of each golf ball from the release block onto the track.

16. The golf ball sorting system of claim 10, wherein the golf ball sorting system is connected in-line to at least one manufacturing system.

17. A method of sorting golf balls, comprising:
- receiving a plurality of golf balls, at least one of which comprises a radar detectable mark, wherein the radar detectable mark comprises ink and is not visible to an observer because the mark is covered by at least one other layer of the golf ball;
- sequentially imparting at least a predetermined minimum speed to each of the plurality of golf balls;
- inspecting each of the plurality of golf balls with a radar detector to determine a detection result based on whether the inspected golf ball includes the radar detectable mark or not; and
- sorting the plurality of golf balls based on the detection results, including separating golf balls that have the radar detectable mark from golf balls that do not have the radar detectable mark.

* * * * *